United States Patent Office 3,524,899
Patented Aug. 18, 1970

3,524,899
CATALYST COMPOSITIONS
John Paton Candlin and Ronald Stanley McKenna, Runcorn, England, assignors to Imperial Chemical Industries Limited, London, England, a corporation of Great Britain
No Drawing. Filed Aug. 21, 1967, Ser. No. 661,772
Claims priority, application Great Britain, Sept. 8, 1966, 40,207/66
Int. Cl. C07c 5/02, 5/08
U.S. Cl. 260—683.9         5 Claims

ABSTRACT OF THE DISCLOSURE

A catalyst composition for the homogeneous hydrogenation of ethylenically or acetylenically unsaturated compounds which comprises the product of reacting a ruthenium compound having a valency of two or more with a simple hydride of a metal of Group I–A or II–A or an element of Group III–B of the Periodic Table or a complex hydride containing more than one such metal or element.

---

This invention relates to catalyst compositions, a process for their production and to their use as homogeneous hydrogenation catalysts.

Many compounds of ruthenium have been described in the literature, some of which have been proposed as catalysts for the homogeneous hydrogenation of unsaturated organic compounds. Those which have been so proposed have all contained ruthenium in the divalent state. We have now found that when certain ruthenium compounds in which the ruthenium has a valency of two or more are treated with a metal hydride, the products are active homogeneous hydrogenation catalysts.

Not only is this treatment capable of reducing ruthenium compounds in which the ruthenium has a valency of more than two to a divalent, active form, but it is also capable of rendering active some otherwise inactive or relatively inactive divalent ruthenium compounds.

According to the present invention we provide a catalyst composition, for the hydrogenation of ethylenically or acetylenically unsaturated compounds in homogeneous liquid media, which comprises the product of the reaction of a ruthenium compound wherein the ruthenium has a valency of two or above with a simple hydride of a metal of Group I–A or II–A or an element of Group III–B of the Periodic Table of the Elements or a complex hydride containing more than one such metal or element.

Preferably the composition is the product of the reaction of a ruthenium compound with a hydride of the general formula $M^IM^{III}H_4$ wherein $M^I$ is a group I–A metal and $M^{III}$ is a group III–B element. In particular, $M^I$ is selected from lithium, sodium, potassium and $M^{III}$ is either boron or aluminium. Particularly suitable hydrides ade $LiAlH_4$, $NaBH_4$, $LiBH_4$ and $NaH$.

An example of the Periodic Table of Elements, referred to herein may be found on page 30 of "Advanced Inorganic Chemistry" by F. A. Cotton and G. R. Wilkinson, published by Interscience.

Hydride reaction may be effected by dissolving or suspending the ruthenium compound in a solvent such as an ether, especially diethyl ether or tetradrofuran. The hydride is then added as a solution, if possible in diethyl ether, or tetrahydrofuran, or otherwise as a slurry or suspension, to the solution or suspension of the ruthenium complex, until effervescence ceases. Refluxing the mixture may be necessary for complete reaction. Excess hydride may be decomposed by adding, dropwise, a reagent which is capable of decomposing it but which will not interfere with subsequent reactions. Water and the lower alcohols are convenient reagents for this purpose but they should be degassed before addition. The reagent is added until effervescence ceases. Should decomposition of the excess hydride produce an insoluble precipitate, this may be separated by decantation, centrifugation or filtration before the catalyst solution is used.

Ruthenium compounds in which the ruthenium has a valency from two to eight may be treated by the specified process in order to give rise to products which function as active hydrogenation catalysts. Such compounds include $RuCl_3(OH_2)_3$, $RuCl_3(SEt_2)_3$, $RuCl_2(PPh_3)_3$, $RuCl_2(AsEt_3)_3$, a red polymer believed to have the formula:

$$[RuCl_2PPh_2(CH_2)_2PPh_2]_n$$

formed from $$RuCl_2(PPh_2(CH_2)_2PPh_2)_2$$

by reduction with zinc dust in naphthalene at 200° C., the the compound believed to have the formula $$(RuCl_2[PPh_2(CH_2)_4PPh_2])_2.$$

The exact mechanism of the hydride reaction is not clear; but, without prejudice to the invention, it is thought that it reduces the ruthenium to the divalent state and facilitates the production of a soluble, hydrido-species of the ruthenium starting material and that the species so formed then functions as an active homogeneous hydrogenation catalyst.

According to a further aspect of the present invention we provide a process for the hydrogenation of ethylenically and acetylenically unsaturated organic compounds in homogeneous liquid media which comprises contacting the unsaturated compound with gaseous hydrogen in the presence of a catalyst composition as hereinbefore described. The liquid medium in which the hydrogenation process of our invention may be carried out may comprise an excess of the unsaturated substrate if it is liquid under the prevailing conditions of temperature and pressure and is a solvent for the catalyst; but it is preferably carried out in the presence of an inert solvent. Examples of suitable solvents include aromatic hydrocarbons (e.g. benzene, or toluene), alcohols (e.g. ethanol, ketones acetone) ethers (e.g. diethyl ether or tetrahydrofuran), saturated hydrocarbons (e.g. n-hexane), or mixtures of such solvents. In some circumstances, chlorinated solvents have an inhibiting effect on the rate of hydrogenation. Furthermore, the use of solvents which act as strong complexing agents for ruthenium, e.g. pyridine or acetonitrile, should be avoided. It will be appreciated that as solubility of the catalyst is essential to success in homogeneous catalysts all catalyst compositions according to our invention will not be equally active in all solvents, but the best solvent or solvent mixture in any particular case may be readily determined. For many catalysts a mixture of an aromatic solvent and a hydroxylic polar solvent, e.g. ethanol/benzene, is preferred.

The process should be performed under substantially oxygen-free conditions; this can conveniently be accomplished by working under an atmosphere of hydrogen alone or mixed with an inert gas, such as nitrogen. Similar precautions should be observed during preparation of ruthenium catalysts. The solution is preferably stirred or shaken during hydrogenation.

Hydrogenation may take place at ambient or elevated temperature, provided that the decomposition temperature of the catalyst is not exceeded; but in many applications, hydrogenation may be accomplished at ambient temperature. Ambient pressure is preferred, but elevated pressures may be used if desired.

The catalyst concentration should be between 1 molar and $10^{-5}$ molar, but is preferably between $10^{-1}$ and $10^{-3}$ molar calculated on ruthenium with respect to the un-

3 saturated substrate. The catalyst is conveniently added to the reaction mixture in the form of a solution.

The invention will now be illustrated by, but is not limited to, the following examples.

EXAMPLE 1

The compound having the empirical formula $$Ru_2Cl_4(PPhEt_2)_6$$

believed to have the structure $$[(Et_2PhP)_3RuCl_3Ru(PPhTt_2)_3]^+Cl^-$$

was reacted with lithium aluminium hydride in solution in tetrahydrofuran. Sufficient ruthenium compound was taken to give a $2 \times 10^{-2}$ molar solution. Excess hydride was decomposed with degassed ethanol.

1 ml. of this solution was introduced into 1 ml. of 2 molar octene-1 in an ethanol/benzene mixture under an inert atmosphere in a glass vessel, a pressure of 1 atmosphere of hydrogen was applied and the mixture agitated by means of a magnetic stirrer, at ambient temperature. Half of the theoretical hydrogen uptake had occurred after 11 minutes.

When the starting material, $Ru_2Cl_4(PPhEt_2)_6$, was used in a similar hydrogenation reaction without pre-treatment with lithium aluminium chloride, there was no measurable hydrogen uptake after 1 hour.

EXAMPLE 2

Using a catalyst produced by the procedure of Example 1, the hydrogenation was repeated using octyne-1 as substrate. Analysis of the products by gas chromatography showed that octene-1 was found, without the corresponding fully saturated octane, at a rate such that half of the octyne was converted in 20 minutes.

EXAMPLE 3

A catalyst was prepared using the procedure of Example 1 starting from the compound $$Ru_2Cl_3(PhEt_2P)_6]^+Cl^-$$

and was used to hydrogenate hexene-1 to n-hexane. Half the theoretical uptake of hydrogen occurred after 15 minutes and was substantially complete after 50 minutes.

EXAMPLE 4

The procedure of Example 3 was repeated using the same catalyst composition but with octyne-1 as substrate. Virtually complete conversion to n-octane occurred after 104 minutes.

EXAMPLE 5

The compound, believed to be $$(RuCl_2[PPh_2(CH_2)_4PPh_2])_2$$

was prepared by refluxing $RuCl_3$ with the diphosphine $$Ph_2P(CH_2)_4PPh_2$$

in n-propanol for 2 hours. A green complex was precipitated from the alcohol and was recrystallized from a chloroform-light petroleum mixture. This was reacted with $LiAlH_4$ and the catalyst so prepared was used for the hydrogenation of octene-1 under the conditions of Example 1.

Half of the theoretical hydrogen uptaken had occurred after 20 minutes.

EXAMPLE 6

$RuCl_3(OH_2)_3$ was reduced as in Example 1 and used to catalytically hydrogenate octene-1. Half of the theoretical $H_2$ uptake had occurred in 40 minutes.

When $RuCl_3(OH_2)_3$ was used without pre-treatment, there was no measurable hydrogen uptake after 1 hour.

EXAMPLE 7

11.8 mg. of $RuCl_3(NO)(PEt_3)_2$ was added to 2 ml. of a 1 molar solution of octene-1 in a 1/1 benzene/ethanol mixture under a hydrogen atmosphere. The solution was stirred magnetically for 2 hours without hydrogen uptake.

118 mg. of $RuCl_3(NO)(PEt_3)_2$ were reduced with 50 mg. of sodium hydride in 8 ml. of tetrahydrofuran under an atmosphere of nitrogen. The mixture was heated to 50° C. and stirred for 1 hour, after which 2 ml. of ethanol were added to decompose the excess hydride. 1 ml. of the resultant solution was used as a catalyst for the hydrogenation of 2 ml. of 1 molar octene-1 as above. This time 13 ml. of hydrogen were taken up in 40 minutes.

EXAMPLE 8

$RuCl_3(SEt_2)_3$ was reduced as in Example 1 and used to catalytically hydrogenate octene-1 under ambient conditions of temperature and pressure. The time required for half the theoretical uptake of hydrogen was 21 minutes.

What we claim is:

1. A catalyst composition for the homogeneous hydrogenation of unsaturated aliphatic hydrocarbons which consists essentially of the product produced by reacting a ruthenium compound in which the ruthenium has a valency of two or more and selected from the group consisting of $RuCl_3(OH_2)_3$, $RuCl_3(NO)(PEt_3)_2$, $RuCl_3(SEt_2)_3$, $$RuCl_2(PPh_3)_3$$

$RuCl_2(AsEt_3)_3$, $Ru_2Cl_4(PPhEt_2)_6$, the product of refluxing $RuCl_3$ with $Ph_2P(CH_2)_4PPh_2$ in n-propanol for 2 hours and the product produced by reduction of $RuCl_2(PPh_2(CH_2)_2PPh_2)_2$ with zinc dust in naphthalene at 200° C. with a simple hydride of a metal of Group I-A or II-A of the Periodic Table or a complex hydride containing one such metal and an element selected from the group consisting of boron and aluminum, the reaction being performed in a liquid medium in the substantial absence of oxygen by adding an excess of the hydride, based on the ruthenium compound, and allowing the reaction to continue until effervescence ceases.

2. A catalyst composition according to claim 1 in which the excess hydride is decomposed by the addition of water or a lower alcohol.

3. A process for the hydrogenation of unsaturated aliphatic hydrocarbons in homogeneous liquid media, which comprises contacting the unsaturated compound with gaseous hydrogen in the presence of a catalyst composition as claimed in claim 1, under substantially oxygen-free conditions.

4. A process according to claim 3 in which the catalyst concentration is from $10^{-1}$ to $10^{-3}$ molar.

5. A process according to claim 3 in which the hydrogenation is carried out in the presence of an inert solvent for the catalyst.

References Cited

UNITED STATES PATENTS 3,113,986   12/1963   Breslow et al. _____ 260—683.9
3,210,296   10/1965   Gray _____ 260—683.9 XR
3,270,087   8/1966    Heck _____ 260—683.9

OTHER REFERENCES

The Condensed Chemical Dictionary, 5th edition (1956), Reinhold Publishing Corp., New York, N.Y., p. 658.

PATRICK P. GARVIN, Primary Examiner

U.S. Cl. X.R.

252—428, 431, 432, 441; 260—683